United States Patent [19]
Laing

[11] Patent Number: 5,758,196
[45] Date of Patent: May 26, 1998

[54] OUTDOOR STUDIO UTILIZING APPARATUS FOR DIFFUSING DIRECT SUNLIGHT

[76] Inventor: Ruth F. Laing, 858 W. Armitage, No. 359, Chicago, Ill. 60614

[21] Appl. No.: 735,707

[22] Filed: Oct. 23, 1995

[51] Int. Cl.$^6$ ............................................. G03B 15/06
[52] U.S. Cl. ..................... 396/1; 135/124; 135/128; 135/157; 135/903; 352/244; 362/18
[58] Field of Search ..................... 396/1, 2, 3, 4, 396/5, 155, 661; 352/243; 362/3, 16, 18, 351, 352, 355; 135/88.11, 88.12, 91, 124, 125, 126, 128, 138, 157, 117, 118, 900, 902, 903; 52/79.1, 80.1, 81.2

[56] References Cited

U.S. PATENT DOCUMENTS

| | | | |
|---|---|---|---|
| 3,811,454 | 5/1974 | Huddle | 52/63 |
| 4,091,584 | 5/1978 | Brown | 52/86 |
| 4,123,152 | 10/1978 | Farnum | 352/243 |
| 4,404,980 | 9/1983 | Wade | 135/102 |
| 4,428,030 | 1/1984 | Baliozian | 362/18 |
| 4,633,374 | 12/1986 | Waltz et al. | 362/18 |
| 5,335,684 | 8/1994 | Hanninen | 135/119 |
| 5,436,804 | 7/1995 | Henry | 362/16 |
| 5,555,681 | 9/1996 | Cawthon | 135/903 |

OTHER PUBLICATIONS

Sales Catalog of Mole–Richardson Co., Hollywood, California, showing Butterfly Combination or 12 Foot Overhead Combination, four pages, date unknown.

*Primary Examiner*—A. A. Mathews
*Attorney, Agent, or Firm*—Dorn, McEachran, Jambor & Keating; Vangelis Economou

[57] ABSTRACT

An outdoor studio for moderating the effects of direct sunlight to be utilized in camera work comprising a screening apparatus, including at least one panel of a scrim material, a self-supporting frame including a plurality of interconnected frame sections for providing support to the screening apparatus, a means for stabilizing the frame and a means for attaching the edges of the scrim material panel to the frame. One embodiment of the inventive outdoor studio further comprises a platform, which may include interconnected modular platform sections, for supporting and mounting the frame. The frame itself may comprise a boxlike rectangularly shaped frame, an overarching quonset hut like structure, or any other appropriate frame structure. The scrim material which may he hung over and clamped onto and over the frame, or may be rolled out vertically and horizontally between uprights and eaves of the frame, can also be attached to the frame by strings or snaps.

20 Claims, 3 Drawing Sheets

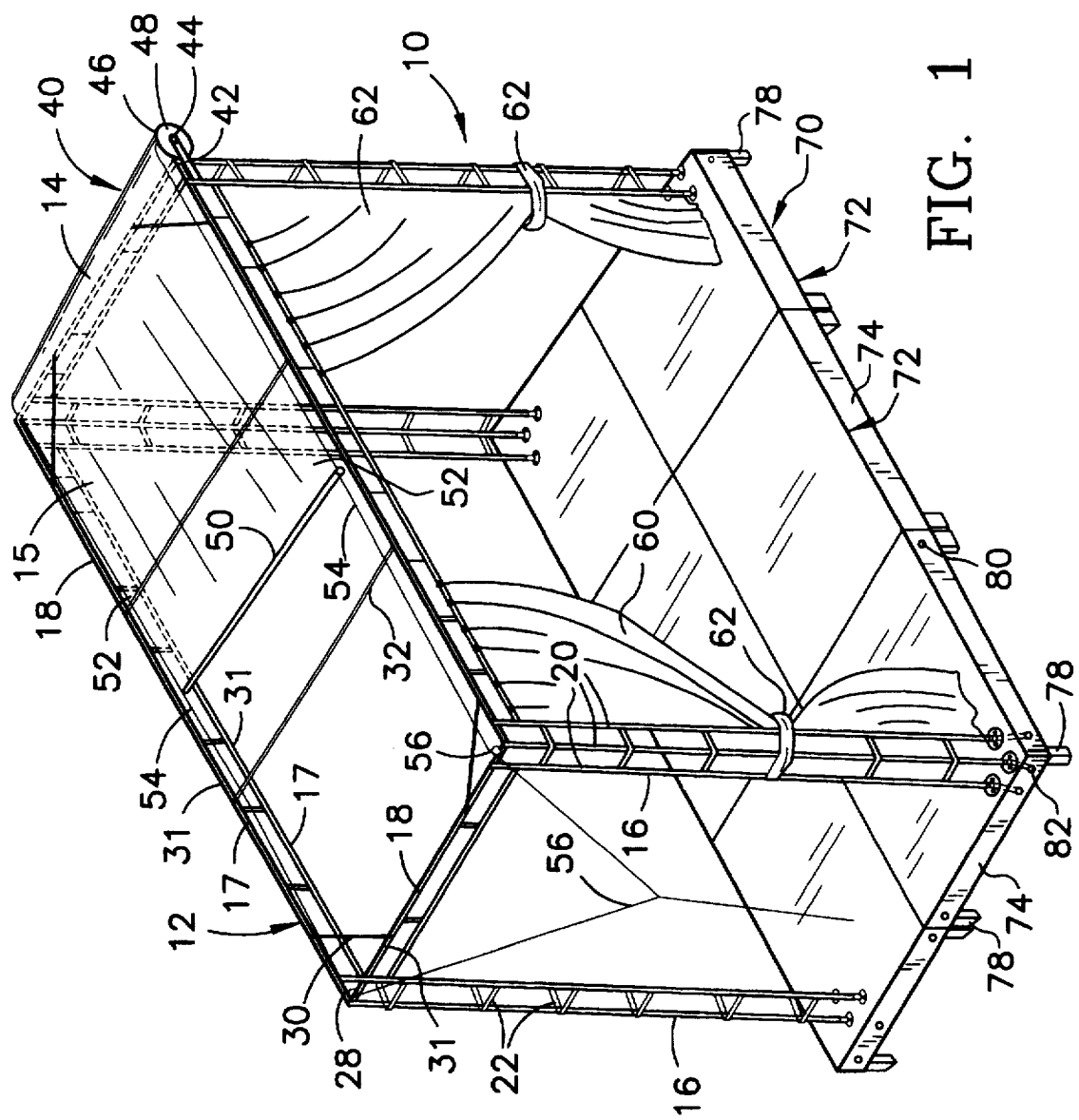

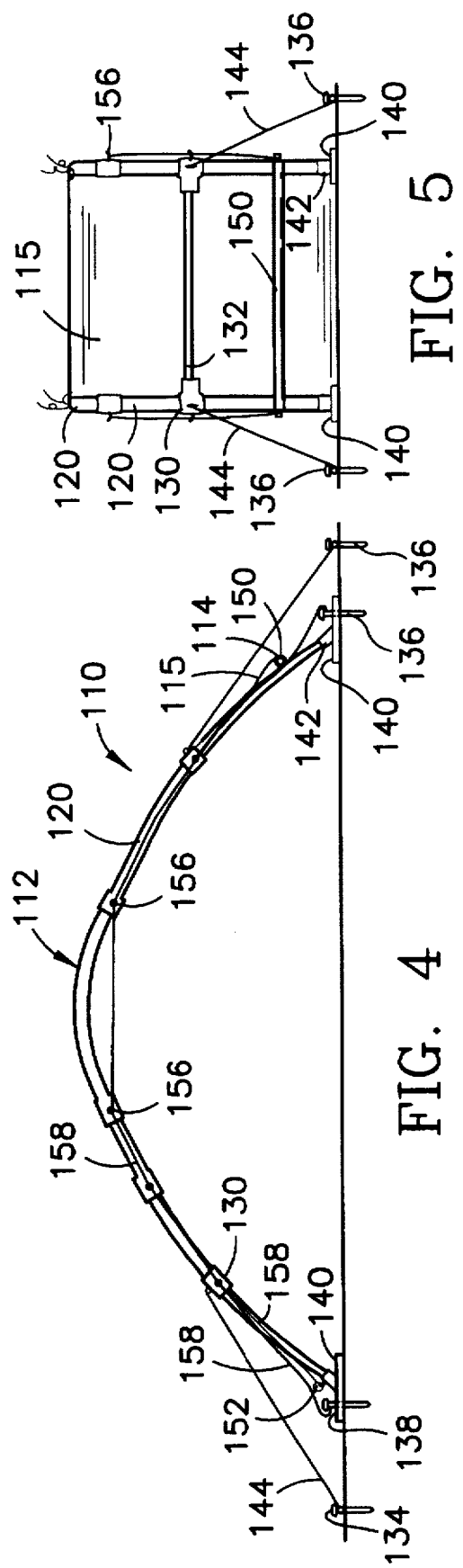

OUTDOOR STUDIO UTILIZING APPARATUS FOR DIFFUSING DIRECT SUNLIGHT

BACKGROUND OF THE INVENTION

1. Field of the Invention

This invention relates generally to outdoor lighting adjustment systems and more specifically to a frame and screen system for controlling the shading effects of direct sunlight irrespective of the angle of the sun.

2. Background Art

Professional model photography and movie production places a strong emphasis on light and shadow of the individual subject or objects in front of the camera, whether a still camera or a motion picture camera. For example, when shooting, that is, photographing or otherwise recording a scene in direct sunlight, it is often necessary to shade or partially shade a subject to avoid the intense contrast between the part of a subject that is directly lit by the sun relative to the part of a subject which is in shadow. Direct sunlight is a major factor in modeling photography and shooting motion pictures, and will cause costly delays in an outdoor shooting schedule. For example, shooting must cease during hours of direct sunlight, (i.e., between 10 a.m. and 3 p.m.) unless the direct sunlight falling on a subject is controlled. On occasion, it is necessary to moderate all shadows which are cast by direct sunlight, so that a shadow may be cast by indirect light or artificial light, such as a lamp providing light through a filter. Often, the area or space in which shade is required extends beyond that which can be provided by conventional shading equipment.

Heretofore available equipment for providing shading or partial shading has compromised one or more stands from which a screen can be extended between the sun and the subject being photographed. Sometimes referred to as a scrim, the screen may comprise one or more layers of a gauze or mesh panel made from a material which is translucent to light and which can diffuse direct sunlight. Suitable materials are cotton mesh, silk or artificial silk materials which are of a neutral color. Representative screens of this type, known as a Butterfly Combination or 12 Foot Overhead Combination may be purchased commercially from Mole-Richardson Co. located in Hollywood, Calif.

Although suitable for most shots in which the subject is a person's face or a small group of people, it is difficult to properly screen a larger area. For example, a composition featuring an outdoor scene which also includes a large number of people, furniture, or other large objects, such as an automobile. Use of the aforementioned conventional screens are limited by the amount of area which may be shaded by each screen, and the requirements of one or more stands to hold the screens above the subjects, sometimes as high as ten or more feet overhead. Moreover, such screens are held up by stands that are necessarily limited in the stand base area so that the bases of the stands do no interfere either with the subjects or the camera angles. Moreover, even slightly windy conditions can cause the stands to become unstable, creating a falling hazard onto the models and other personnel. Mole-Richardson Co. recommends use of sandbags for providing ballast on the stand bases, the large screen area of a fabric or mesh panel catches even small amount of wind. A temporary solution requires using assistants to hold up the stands, but this is a labor intensive exercise which greatly inconveniences the personnel on location, both from the need for a person to continually holds up a swaying stand and from the removal of assistants who are needed for other duties.

Thus, what is needed is a stable, stand alone frame for supporting one or more scrim panels that will normally not require attention or other maintenance after assembly, and which can be utilized to control and adjust the intensity of direct natural sunlight without greatly affecting the outdoor studio in which the subjects are disposed.

SUMMARY OF THE INVENTION

Accordingly, what is disclosed is an outdoor studio for providing moderation of the effects of direct sunlight for camera work comprising a screening apparatus for moderating the effects of direct sunlight over an area intended for studio work, including at least one panel of a scrim material, a self-supporting frame including a plurality of interconnected frame sections for providing support to the screening apparatus, a means for stabilizing the frame and a means for attaching the edges of the scrim material panel to the frame.

One embodiment of the inventive outdoor studio further comprises a platform, which may include interconnected modular platform sections for supporting and mounting the frame. The frame itself may comprise a boxlike rectangularly shaped frame, an overarching quonset hut like structure, or any other appropriate frame structure. The scrim material, which may be hung over and clamped onto and over the frame, or may be rolled out vertically and horizontally between uprights and eaves of the frame, can also be attached to the frame by grommets on the scrim material and by rope, twine, strings or snaps.

BRIEF DESCRIPTION OF THE DRAWINGS

FIG. 1 is a perspective, idealized view of one embodiment according to the present invention;

FIG. 4 is an elevational front view of another embodiment according to the present invention; and FIG. 5 is an elevational side view of the embodiment illustrated in FIG. 4.

DETAILED DESCRIPTION OF THE PREFERRED EMBODIMENTS

Figure 3:
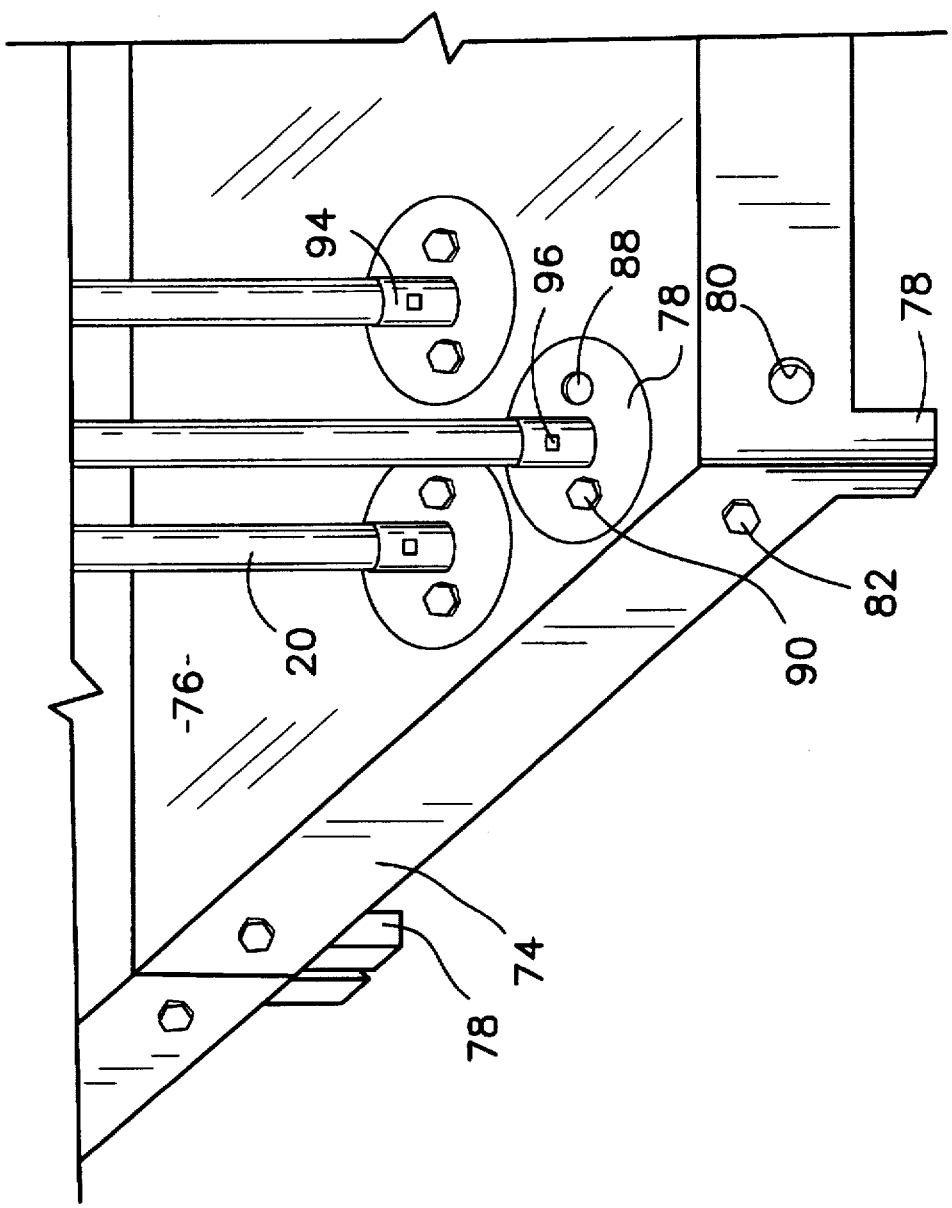
FIG. 3 is a detail drawing of the anchoring or stabilizing means according to the present invention.

Referring now to FIG. 1, a perspective view of one preferred embodiment of the inventive outdoor studio shows a sunlight screening system 10 for use as an outdoor studio in professional camera work. System 10 comprises a stabilized and secured frame 12, preferably constructed of metallic, modular tubular members, which frame is self-supporting. Disposed upon said frame 12 is a screening apparatus 14, preferably including a screen or scrim fabric 15, which is adjustable in the amount of square footage area of screening apparatus which is interposed between the subject and the sun, as will be described below.

Frame 12 comprises four corners, each having a trussed upright 16, and four trussed eaves 18, extending between and connecting the top sections of the trussed uprights 16. Each trussed upright 16 may be further strengthened by including three upright, tubular poles 20 which are attached to each other by trusses 22. The trusses 22 may attach the upright or vertical poles 20 to each other by welding or other appropriate attachment means. Preferably, the trussed uprights 16 comprise several, joined vertical 5-foot sections, in which the poles 20 are attachable to each other at their ends by a sleeve and pin arrangement, shown in detail in FIG. 2. Use of 5-foot sections results in a "ceiling" having a height of 10 feet if two such sections are used and 15 feet if three sections are used in each upright 16. A 10 foot height for the screening or scrim fabric is preferable because it provides better diffusion characteristics.

The upper sections of each upright 16 are connected by an appropriate connection means, as described below, to a trussed connection member 28. Each connection member 28 has three separate parts for connection first to the three poles 20 of an upright 16 and then to each of two trussed eaves 18 extending at right angles to each other and to the upright 16 to which the connection member 28 is connected. Each connection member 28 may also comprise one or more diagonally extending brace 30, one of which is shown in FIG. 1 for each connecting member 28. The brace 30 is shown attached to the free ends of at least one horizontally extending tubular pole section 31 of connection number 28.

The pole sections 31 of connection members 28 connect to the pole 17 of each of the eaves 18. The brace 30 is attached by welding or similar means to the ends of metal pole section 31 of the connection member 28 so that the right angle formed by the eaves 18 is maintained, thereby aiding in stabilizing the superstructure of frame 12. Optionally, additional braces (not shown), may be used to attach the ends of horizontal pole section 31 of the connecting member 28 to the ends of the vertically extending pole sections for providing further stabilization to the structure.

Each trussed eave 18 preferably comprises two horizontally extending poles 17 which are attached to each other by trusses 19 that are welded or otherwise attached to the sides of poles 17. The two poles 17 of each eave are preferably disposed vertically one over the other, and each eave 18 may also comprise modular 5 foot sections which are attachable to each other by a sleeve and pin arrangement, as will be described below with reference to the detail drawing of FIG. 2. The number of sections used in each of the eaves 18 will depend on the desired dimensions of the space enclosed by the frame 12. Two five foot sections may be deployed to provide a 10 foot depth and four five foot sections may be deployed to provide the width, which arrangement will result in an enclosed area of about 20 feet by 10 feet. This area is generally sufficient for most outdoor shots.

Figure 2:
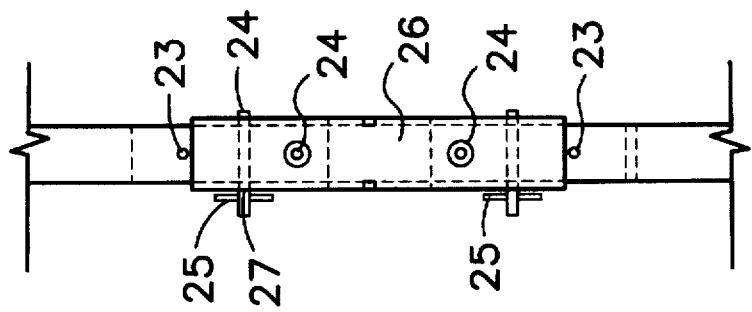
FIG. 2 is a detail drawing of the connection means of the poles according to the present invention.

Referring now to FIG. 2, a connection joint between two poles 17, and 20 is shown in a detailed breakaway view. A pole, whether a vertical pole 20 or a horizontal pole 17, can be attached to a corresponding like pole of the adjacent section by a sleeve and pin mechanism. For example, a vertical pole 20 from each upright 16 can be connected to the pole 20 of the immediately adjacent pole 20 exactly below the other pole. Each pole 20 includes apertures 23 bored through the surface, which apertures are sized to receive pins 24 therethrough. The apertures may be spaced apart from each other by a predetermined distance, and may also include alternating transversely oriented apertures 23, as shown. Each pin 24 further includes a smaller aperture 25, disposed transverse to its longitude, for retaining the pin 24 within the aperture 23 after it has been inserted into the aperture 23.

A tubular sleeve 26 has an inner surface that is sized and oriented to receive the poles 20 when these are inserted into the sleeve 26. The sleeve 26 also includes apertures 27 extending through the tubular wall of sleeve 26 which are also sized and dimensioned to receive the pin 24. Preferably, the tubular sleeve apertures 27 correspond in spaced apart relationship and in orientation to the pole apertures 23, so that after insertion, the pins 24 may be inserted into one aperture 23 on one tubular wall of sleeve 26, through aperture 23 of the pole 20 and then through the other aperture 27 on the opposing wall of tubular sleeve 26. After the pin is inserted, a metallic spring clip 29 may be inserted into the pin aperture 25 to retain the pin in place within the apertures 23, 27.

Of course, a modular frame system such as the one described may be constructed for enclosing a smaller or larger total area of the outdoor studio, depending on the user requirements. However, with increasing number of modular sections used on the frame construction, it may be necessary to further support oppositely disposed eaves 18 with laterally extending support bars 32 which are connected to the horizontal poles 17 by a sleeve having the form of a T-joint. The use of such T-joints are described below in relation to another inventive embodiment, and that description is equally applicable here.

The use of support bars 32 should be kept to a minimum, however, since any opaque object interposed between the sun and the subject being photographed may result in undesirable shadows being cast over the subject. Nevertheless, when high wind conditions are expected, support bars 32 may be an unavoidable safety requirement. Serious injuries may be caused by buckling or collapsing of the frame 12, especially if the eaves 18 or vertical uprights 16 extend for excessive lengths without lateral support being provided by bars 32 or the like. In those situations, support bars 32 and other supporting mechanisms may be desirable, if not necessary.

Construction of the frame 12 in the manner described above results in substantial frame stability so that the frame 12 can be used as a base for supporting assorted shading or screening mechanisms, and even of props, furniture, floating walls, and other objects, which would be desirable in a camera session. Shown in FIG. 1 is a screening apparatus 14 which is directly supported by the frame 12.

The screening apparatus may take any of a number of forms. The most important characteristic of any screening apparatus is that is firmly attached to the frame 12 at the edges so that the frame can support and retain the screening apparatus in place without requiring any personal attention on the part of the camera or lighting crew. For example, a scrim material, such as a gauze or woven silk cloth panels may be draped (not shown) over the eaves 18 and attached by clamps or other suitable means in a manner which maintains the space between the uprights 16 free and clear for "outdoor" shooting. If the panels are draped so that no portion of the scrim material hangs down from the eaves 18, a clear shot may only require adjustment of the camera angles so as to avoid the uprights.

The scrim material may also comprise separate panels (not shown) which are directly attachable at the edge to the poles 17, 20 by snaps or other means, as will be described below. The scrim material panels themselves provide a translucent surface which diffuses any direct sunlight passing therethrough. The panels may also be extended between the frame 12 to make the fabric panels taut, thereby bringing substantial uniformity to the diffused sunlight.

Another consideration in attaching the shading or screening apparatus 14 regards the manner of attachment to frame 12, either by attaching the scrim fabric 15 directly to the poles 17 of eave 18 or by attaching the scrim fabric to a frame (not shown) and then attaching the edges of that frame to the poles 17. It is important to provide attachments of the scrim fabric 36 at points all along the edges of the longitudinal dimension, and even the width, of eaves 18 to avoid billowing of the scrim fabric. Appropriate means of attaching the scrim fabric may include grommets (not shown) that are spaced every one to two feet along the edges of the scrim fabric 15, through which string or twine may be inserted and used to tie the fabric edge to the uppermost pole 17 of eave 18. The scrim may have cloth tabs (not shown) which include snaps, the tabs being of a length to encircle the pole 17 and attach to the corresponding part of the snap connection attached to the scrim fabric adjacent the tab. Preferably, the one part of a snap may be attached to the metal poles 20, and the other part of snap may be sewed directly on the edge of the scrim fabric 15. To use such a snap mechanism, panels of scrim fabric would simply be snapped onto the frame poles 20.

A preferable construction of the shading or screening may include a roller mechanism 40, as shown in FIG. 1. The roller mechanism 40 is shown attached to the frame 12 at the connection member 28 by a pair of flanges, one flange 42 being visible in FIG. 1, which flanges may be welded or otherwise connected to the pole sections making up the connection member 28. Each flange 42 should have a laterally bored aperture 44 for supporting the roller mechanism 40.

Although the roller mechanism 40 is shown attached at the top of the uprights 16, it is also feasible to provide that connection at the bottom of the uprights, adjacent the lower ends of the uprights 16. This arrangement would require a sliding surface at the top of the eave 18, located above the roller mechanism 40, so that the scrim fabric is of screening apparatus 14 can extend upwardly between the two uprights 16 and then "fold over" one shorter eave 18 to extend horizontally between the longer eaves 18. For certain shots, the screening apparatus may provide intensity adjustment of sunlight passing through the frame 12 from the side, rather than from above.

Roller mechanism 40 comprises any of a number of forms. A swath or bolt of scrim fabric 15 be rolled around a tube or drum 46, which rotates about an axis that extends longitudinally through the center of the drum 46. At each end of the drum 46 and concentric with the axis, there is disposed a spindle 48, one of which is shown in FIG. 1. The spindles 48 may fit into the corresponding apertures 44 in the flanges 42, thereby supporting the drum to spread out or take up lengths of scrim fabric 15 within the frame 12.

The adjustment of the position of the scrim fabric 15 over the desired portions of frame 12 is made possible by rolling up of the unneeded scrim fabric around the drum 46. The paying out and taking up the scrim fabric 15 may be done manually, or by a crank mechanism (not shown) attached to one or the other spindle 48, or by motor mechanism (not shown). It is optional on the part of the user as to which take up mechanism to utilize, the important considerations are to maintain the scrim fabric 15 taut along the top and/or side surfaces of the frame 12 and also, to retain the scrim fabric attached to the poles 17, 20 in order to avoid billowing of the scrim fabric 15.

One preferred method for providing take up for the screening mechanism 40 is a type of roller and pull cord arrangement as shown in FIG. 1. This arrangement is similar to a pull down shade used for residential windows. A spring loaded mechanism within the drum 46 becomes wound up as the fabric is unrolled, and a trip mechanism (not shown) retains the scrim fabric position in a desired screening position until it is released.

To assist the scrim fabric 15 to be unrolled from drum 46, a transparent rib 50, which may comprise a clear plastic material, extends along the length of the scrim fabric 15 at the outermost end. The fabric may b e loop ed about the rib 50 to present a slip into which the rib may inserted. At each of the corners 52 of the scrim fabric 15, a pull cord 54 is attached by appropriate means, such as an eye socket. Each pull cord 54 extends from corner 52 adjacent the longitudinal eaves 18 to a respective roller 56, through which the pull cord provides a change in direction of the pull cord.

It is desirable to have a dual pull cord arrangement, as shown, so that the pull cords 54 do not extend over the surface between the eaves 18. This arrangement avoids creation of undesirable shadows falling on the subjects which may be created by solid objects interposed between the eaves 18. Similarly, use of a transparent or clear plastic rib 50 reduces the effects of any shadow which may be created by sunlight which may be partially occluded by rib 50. Alternately, a rib may be found unnecessary if the arrangement utilized grommets for attaching the pull cords 54 to the corners 52 of the scrim fabric 15.

The pull cords 54 may be pulled simultaneously by a user at the end of frame 12 which is disposed oppositely from the end to which the screening mechanism 40 is attached. The two pull cords 54 may be joined at a point 58 beyond where they overhang the eave 18 so that the rib 50 may be pulled uniformly along its length.

Another feature of the invention is the flexibility provided when using a frame 12. Although one preferred method of sunlight intensity adjustment is shown in FIG. 1, other methods or a combination of methods are also possible. For example, should a particular scene require full shadow in an outdoor setting, additional scrim fabric (not shown) may be draped over the frame 12 in addition to the fabric 15 shown in the embodiment of FIG. 1. Alternatively, a heavy cotton fabric, through which the passage of light is essentially blocked, may be used to result in a no shadow situation where no direct overhead light falls within the space defined by the frame 12. It is also possible to adjust the intensity of light getting through to the scene by either changing one drum 46 for another drum having a different scrim material, or to add two or more scrim fabrics to a particular drum 46 to obtain the desired amount of reduction in sunlight intensity.

Another adjustment may be utilized when the complete surface between eaves 18 is not covered by the scrim fabric 15, but rather, as shown, the space is only partially screened. This arrangement may be desirable in a situation where some overhead sunlight may be necessary to light the backdrop of a subject who is in the diffused light portion of the space, or when one subject is in direct sunlight and another not.

Yet another feature which is provided by the inventive system 10 is the disposition of a backdrop or props that may be attachable to the uprights 16 or eaves 18 to provide a background to the subjects in front of a camera. For example, as shown, curtains 60 may be hung from the eaves 18 and a sash 62 may be used to fasten the curtains 60 to the trussed upright 16. Other backgrounds may also be utilized. For example, props, such as columns, door frames, floating walls or furniture, any or all of which may be attached to uprights 16, to show a scene outdoors of a building, which scene may require both indoor and outdoor locations utilizing the same outdoor studio.

Referring again to FIG. 1, another feature is illustrated which is desirable for simulating an indoor environment in an outdoor studio setting. The embodiment as described above makes no mention of a platform or stage for supporting or mounting the frame 12 and system 10. Although it is possible to utilize such a system 10 directly on the ground, it is in most cases preferable to include a supporting platform 70 upon which the frame 12 is stabilized, leveled and/or anchored.

As shown in FIG. 1, plural modular units such as units 72, may be connected together to form the base or stage platform 70 of the system 10. Each modular unit 72 may comprise an integral unit or preferably, a metal base 74 covered with a plywood top 76. The metal base 76 further comprise metal legs or supports 78 for supporting each unit 72 on the ground, which legs or supports extend downwardsly from the base 74. Apertures 80 based through the metallic surface may be utilized to attach the modular units 72 to each other and to attach the frame 12 to the platform 70 by means of bolts 82 that extend through the apertures 80.

Although not shown with reference to FIG. 1, tethers (not shown) attached to stakes (not shown) driven into the ground away from the frame 12 may be utilized to stabilize the frame. Such tethers are described below with reference to an alternative embodiment, but the stake and tether arrangement therein discussed also may be utilized with the frame 12. Use of such a tether arrangement may be necessary, especially when the frame 12 is erected without a floor or platform, discussed below.

Referring now to the detail of FIG. 3, the system 10 includes means for attaching and anchoring the frame 12 to the platform 70, and more specifically, to the metal base 74 of each of the units 72 disposed at the corners of platform 70. The bottom of trussed uprights 16 each include a foot member preferably comprising a round disk 78, in which two of more vertical apertures 88 are bored. Corresponding bores are located in the corners of the plywood boards 76 of each of the corner modular units 72, and bolts 90 are utilized to attach the disk 78 to the platform 70. For added stability and sturdiness, the bolts 90 may be further connected and secured to bolts 82 which are disposed and attached to the metal base 74 through the disk bolt apertures 80. The two bolts 82, 90 may be connected to each other by an appropriate means, such as a turnbuckle (not shown), which extends between and is secured by the hex nuts (not shown) that are used to attach the bolts to the surfaces described. Use of heavy washers (not shown) are also recommended so that the bolts and hex nuts do not slip through the attachment apertures.

The disk may also be integral with or attached by welding to a tubular sleeve member 94 having an inner diameter surface sized to receive the ends of the lowermost poles 20 of the uprights 16. Further transverse apertures may be sized and oriented for insertion of pins 96 to releasably connect each of the poles 20 to the corresponding foot member 80, to retain stability of the frame 12.

The preferred materials for manufacturing the frame and related apparatus may be standard, commercially available items that can be customized for use with the inventive sunlight diffusion outdoor studio systems. However, for those systems that will be reused at various sites, an outdoor studio system is desirable which is portable and is easy to erect and breakdown for transport. For such systems, aircraft weight aluminum may be utilized for manufacture of the poles 17, 20, trusses 22, connection members 28, sleeves 26 and T-joints, while the pins 24 and bolts 82, 90, turnbuckles, etc., comprise stronger materials, such as heat treated steel. Additionally, if five foot sections are utilized, boxes or other containers having appropriate dimensions may be constructed or used for storage of the sections. Portability and integrity of the system may thus be assured during transport.

Referring now to FIGS. 4 and 5, front and side elevational views illustrate a modified embodiment 110 according to the present invention. The modified embodiment 110 includes a frame 112 and a scrim apparatus 114 for paying out and taking in a scrim fabric 115, similar to that described above in the embodiment 10. However, the features of the embodiment 110 include a curved frame and illustrates how this invention may be utilized without a platform or base, such as platform 70 of the embodiment 10 (FIG. 1).

Frame 112 may comprise more flexible tubular elements than those of frame 12 (FIG. 1). For example, lengths of polyethylene or plastic tubing may be connected to each other and then bent to achieve a "quonset hut" effect where the height at the center is 10 feet tall. The center section of the portions of frame 112 can be raised at its central portion to a height of 10 feet to permit a camera to operate efficiently thereunder. Of course, the material alternatively may comprise metal or lightweight composite materials which are pre-formed to the desired curvature and thereby providing an alternative frame structure.

As can be seen in the side view of FIG. 5, two sections of frame 112 are intended to be disposed parallel to each other with an appropriate separation of about 10 feet. Utilizing similar material and orientation of the modular members 120 will provide an essentially identical curvature to each section of the frame 112.

Joining the two sections to each other is accomplished by a plurality of T-joints 130 including sleeves into which cross-bars 132 may be inserted. The T-joints 130 may be attached to the tubular members 120 of the frame 112 in appropriate manner, such as by a clamp or other similar means.

Alternatively, each T-joint may also comprise a joining means for joining the tubular members 120 to each other at the ends, with a cross-bar 132 being inserted into the laterally extending tube connection of T-joints 130 at appropriate positions. The ends of tubular members 120 and cross-bars 132 may be secured within the tubular extensions of the T-joints 130 by means of set screws or other appropriate means.

Once the frame 112 has been assembled, it should be secured or stabilized relative to the ground. Any of a number of securing means may be utilized, such as stakes or posts 136 which are inserted into appropriate anchoring or securing aperture 138. The aperture 138 may be disposed in the end of the tubular member 120 adjacent the ground of may be in a base or foot 140 such as foot member 80 (FIG. 3). Of course, the tubular connecting portion 142 of the foot 140 should extend diagonally from the flat disk of foot 140 to accommodate the angled connection of the portions of frame 112. The apertures 138 will be large enough to permit the stake 136 to be driven through aperture 138 and into the ground for a sufficient depth to secure the frame 112 in windy conditions.

Although illustrated in use without a platform, the system 110 may also comprise such a platform (not shown) when needed by appropriate applications. In such an application, the disk 140 may be secured to a platform, similar to platform 70 (FIG. 1), by bolts or other securing means as shown in FIG. 1.

For added stability, cables 144 may be fastened to an appropriate place, such as eye hooks, disposed on the T-joints. The cables 144 may extend laterally away from the frame 112 to a point on the ground where another stake 136 may be used to secure the cable to the ground. Such an arrangement inhibits lateral movements of the frame assembly 112, and thereby stabilizes the structure in severe conditions.

Screening apparatus 114 may also take any of a number of forms, as is described relative to the embodiment of FIG. 1. However, the screening apparatus may be a roller type mechanism 150 utilizing pulleys 152 to revolve the mechanism 150 and wind the scrim fabric 115 out of the mechanism 150.

Ropes 154 may be wound around the Pulley 152 and roller mechanism 150. Such arrangements are known for use in shades with slats. The arrangement of this mechanism may also include additional hooks 156 spaced along the outside of the tubular members 120 on which the ropes may rest so as to keep the ropes 158 out of position of the camera angle.

This invention has been described and illustrated in relation to several alternate embodiments which are described herein for purposes of example only, and not of limitation. The invention is considered as having a full scope and is only limited by the following claims and equivalents thereof.

What is claimed is:

1. An outdoor studio for providing adjustable moderation of the effects of direct sunlight for camera work within an outdoor studio work area comprising:
   a) a screening apparatus, including at least one panel of a scrim material, for moderating the effects of direct sunlight over the studio work area;
   b) a self-supporting frame including a plurality of interconnected frame sections for providing support to said screening apparatus, said frame essentially surrounding said studio work area;
   c) a means for stabilizing and securing said frame to the ground at a plurality of edges of said frame; and
   d) a means for selectable extending at least one of said panels of scrim material between at least two of said frame sections and for releasably attaching the edges of at least one panel of said scrim material to at least one of said frame sections, said at least one panel of the scrim material being interposed between said studio work area and the sun, such that selective interposition of said at least one panel of scrim material renders adjustable the amount of reduction in sunlight intensity striking said outdoor studio work area.

2. The outdoor studio for providing moderation of the effects of direct sunlight according to claim 1 wherein said interconnected frame sections further comprise a plurality of tubular members, at least some of which tubular members extend parallel with each other and are attached to each other by laterally extending trusses.

3. The outdoor studio for providing moderation of the effects of direct sunlight according to claim 1 wherein said screening apparatus further includes a roller mechanism to selectively take up and pay out said scrim material panel so as to adjust the amount of shading over said studio work area to a desired amount.

4. The outdoor studio for providing moderation of the effects of direct sunlight according to claim 1 further comprising a platform to which said frame is attached and upon which said frame is supported, said platform further including a plurality of means for stabilizing and securing said platform and said frame to the ground.

5. The outdoor studio for providing moderation of the effects of direct sunlight according to claim 4 wherein said platform further comprises plural modular units which are attachable to each other.

6. The outdoor studio for providing moderation of the effects of direct sunlight according to claim 1 wherein said frame comprises four vertically upright frame sections, each one of which is attached to a corner of said platform.

7. The outdoor studio for providing moderation of the effects of direct sunlight according to claim 5 wherein said frame is attached to corners of said modular platform units which are disposed at the corners of said platform.

8. The outdoor studio for providing moderation of the effects of direct sunlight according to claim 1 wherein said means for attaching the edges of said scrim material panel to said frame further includes grommets inserted at a longitudinal edge of said scrim material panel through which rope or twine are utilized to attach the scrim material edge to said frame.

9. The outdoor studio for providing moderation of the effects of direct sunlight according to claim 1 wherein said means for attaching the edges of said scrim material panel to said frame further includes flexible tabs attached at one end to said edges of said scrim material and having a first snap member at the end of said tabs not attached to said scrim material, said scrim material further including a second snap member for attaching at said first snap member, said flexible tab including a loop encircling around one tubular member of said frame.

10. The outdoor studio for providing moderation of the effects of direct sunlight according to claim 1 wherein said frame sections further comprise tubular, modular sections.

11. The outdoor studio for providing moderation of the effects of direct sunlight according to claim 10 wherein said tubular, modular sections are formed, dimensioned and oriented to thereby enable the elements of the system to be stored in a compact container, and rendering the system easily transportable.

12. The outdoor studio for providing moderation of the effects of direct sunlight according to claim 1 wherein said system is formed and dimensioned to enable its storage in a compact container, thereby rendering the system easily transportable.

13. The outdoor studio for providing moderation of the effects of direct sunlight according to claim 1 wherein said frame further includes upright tubular elements which may provide support for additional props and other objects.

14. A screening system for adjusting outdoor lighting conditions in professional photographing, comprising
   a) a frame essentially enclosing a target space;
   b) an anchor, connected to said frame, for anchoring said frame to the ground;
   c) a plurality of translucent members which adjustably screen the full effect of direct sunlight, said members being releasably attachable to said frame, such that direct sunlight passing through said frame selectable passes through predetermined ones of said translucent members and said direct sunlight is diffused to moderate the effects of shadows resulting from direct sunlight, and said at least one of said translucent members is selectable interposed between the sun and said target space by attaching or detaching at least one of said translucent members to said frame, thereby rendering adjustable the intensity of the sunlight reaching said target space according to the desired effect.

15. A temporary or semi permanent structure for providing adjustable moderation of the effects of direct sunlight within an adjustable shade area over a supporting surface, said adjustable shades are being essentially surrounded by said structure comprising:
   a) a screening apparatus, including at least one panel of a scrim material, for moderating the effects of direct sunlight over said adjustable shade area;

b) a self-supporting frame including a plurality of interconnected frame sections having edges for providing support to said screening apparatus, said frame essentially surrounding said adjustable shade area;

c) a means for stabilizing and securing said frame to the supporting surface at a plurality of edges of said frame; and d) a means for selectably extending at least one panel of said scrim material panel between at least two of said frame sections and releasably attaching the edges of said panel to appropriate edges of said frame so that at least one panel of the scrim material is interposed at any time between said adjustable shade area and the sun, thereby rendering adjustable the intensity of the sunlight reaching said adjustable shade area according to the desired effect.

16. The structure for providing moderation of the effects of direct sunlight according to claim 15 further comprising a platform to which said frame is attached and upon which said frame is supported, said platform providing the plurality of means for stabilizing and securing said frame to the ground, said platform further comprising plural corners.

17. The structure for providing moderation of the effects of direct sunlight according to claim 15 wherein said platform further comprises plural modular units which are attachable to each other, each modular units having at least one coverage so that when assembled, the modular unit platform defines said plural corners.

18. The structure for providing moderation of the effects of direct sunlight according to claim 17 wherein said frame is attached to said plural corners of said platform.

19. The outdoor studio for providing moderation of the effects of direct sunlight according to claim 15 wherein said frame comprises four vertically upright frame sections, each one of which is attached to a corner of said platform.

20. The structure for providing moderation of the effects of direct sunlight according to claim 15 wherein said frame further includes at least four upright elements for providing support for additional props and other objects, at least one of said upright members being attached to a corner of said platform.

* * * * *